July 18, 1933.  J. JENSEN  1,918,647
ANIMAL POKE
Filed Feb. 1, 1933   3 Sheets-Sheet 1

Inventor
Jens Jensen
By Clarence A. O'Brien
Attorney

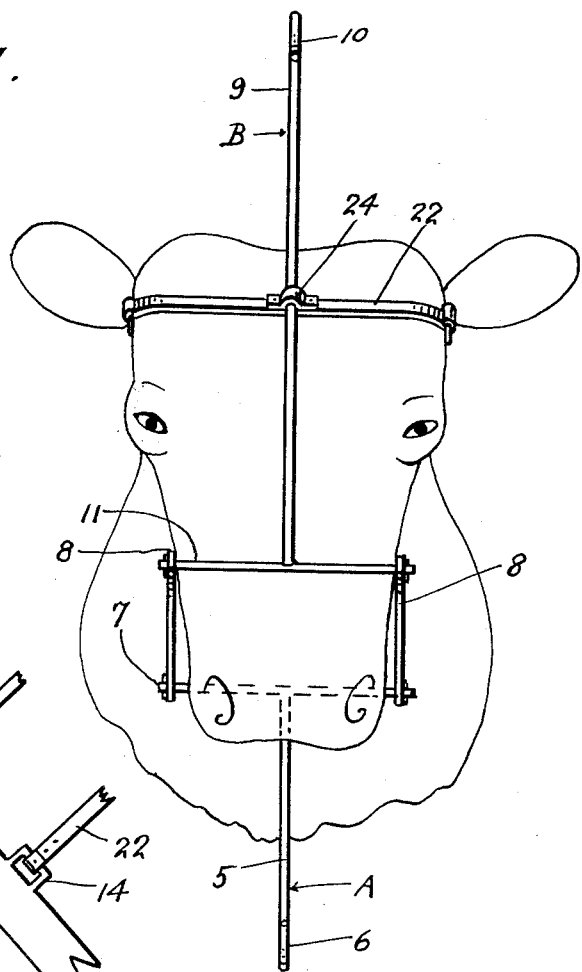
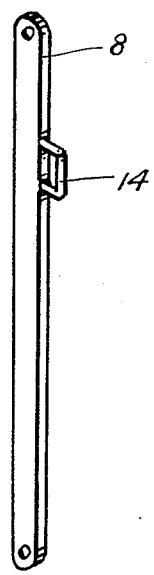
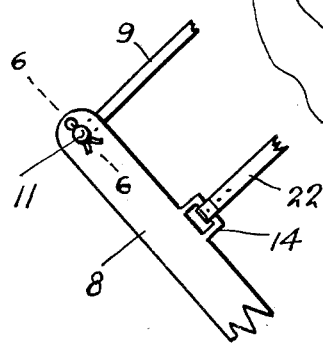
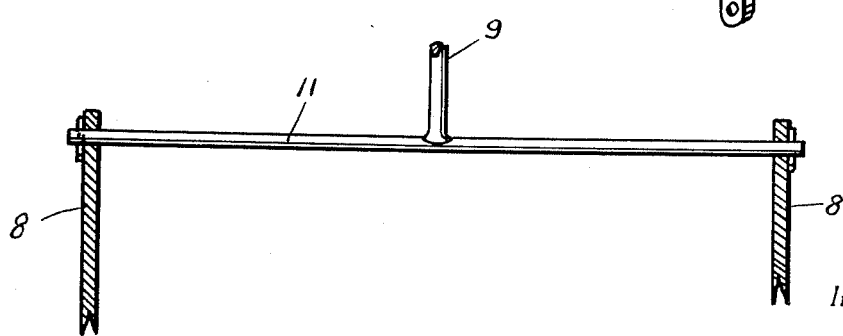

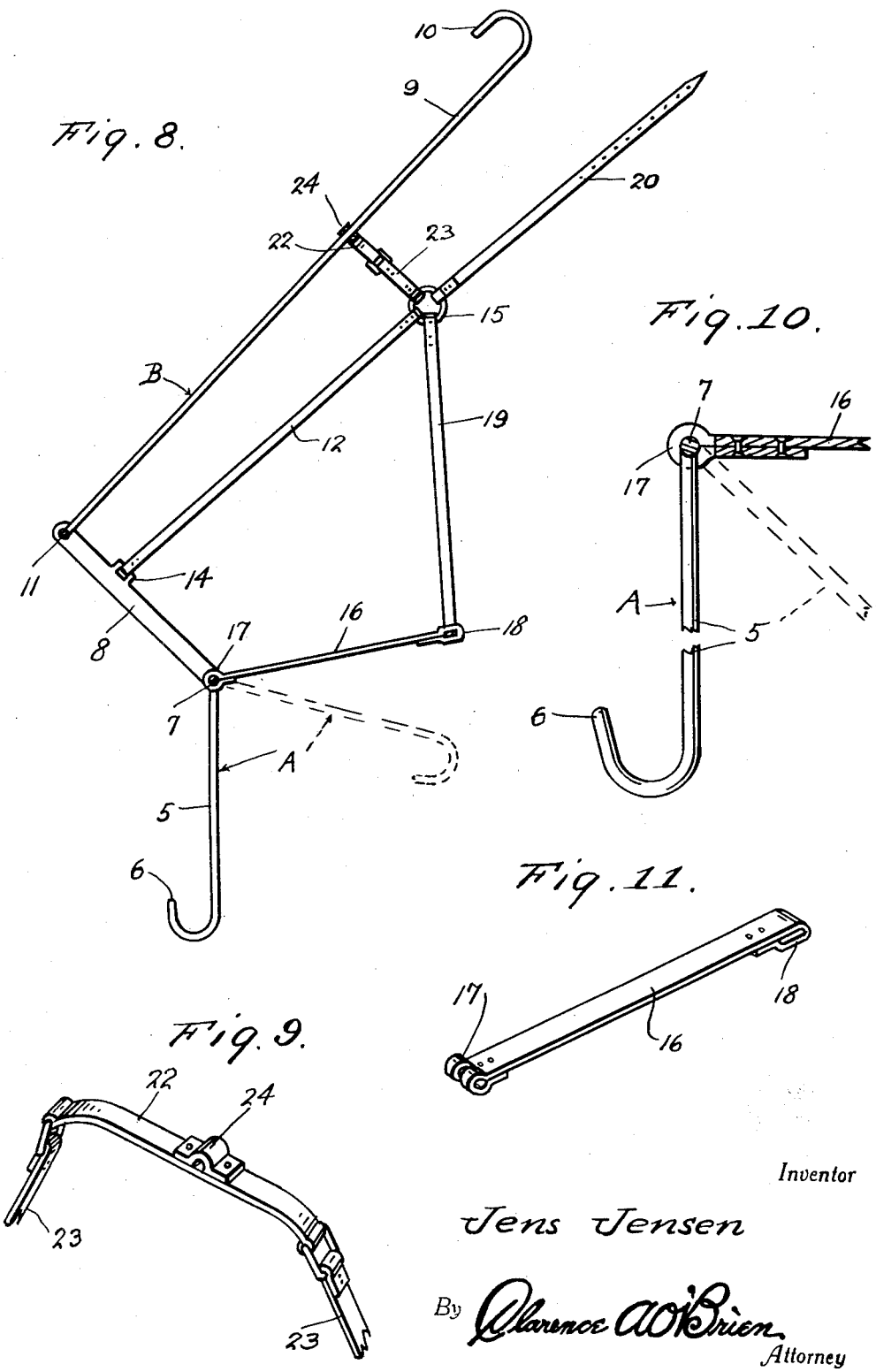

Patented July 18, 1933

1,918,647

UNITED STATES PATENT OFFICE

JENS JENSEN, OF RHAME, NORTH DAKOTA

ANIMAL POKE

Application filed February 1, 1933. Serial No. 654,716.

The present invention relates to animal pokes and has for its object to provide a simple and efficient device having means for preventing the animals feeding either over or through a fence, while at the same time not interfering with the feeding in the ordinary manner.

Another very important object of the invention resides in the provision of a device of this nature which is inexpensive to manufacture, easy to place on and remove from the animal's head, thoroughly reliable in use, inexpensive to manufacture and otherwise well adapted to the purpose for which it is designed.

With the above and numerous other objects in view as will appear as the description proceeds, the invention resides in certain novel features of construction, and in the combination and arrangement of parts as will be hereafter more fully described and claimed.

In the drawings:

Figure 4 is a front elevation of the poke on an animal's head.

Figure 5 is a fragmentary enlarged view of one of the side members.

Figure 6 is a detail sectional view taken substantially on the line 6—6 of Figure 5.

Figure 7 is a perspective view of one of the side members.

Figure 8 is a side elevation of the poke.

Figure 9 is a perspective view of the head bar.

Figure 10 is a detail section through a portion of the bottom hook, and

Figure 11 is a perspective view of the chin bar.

Figure 1:
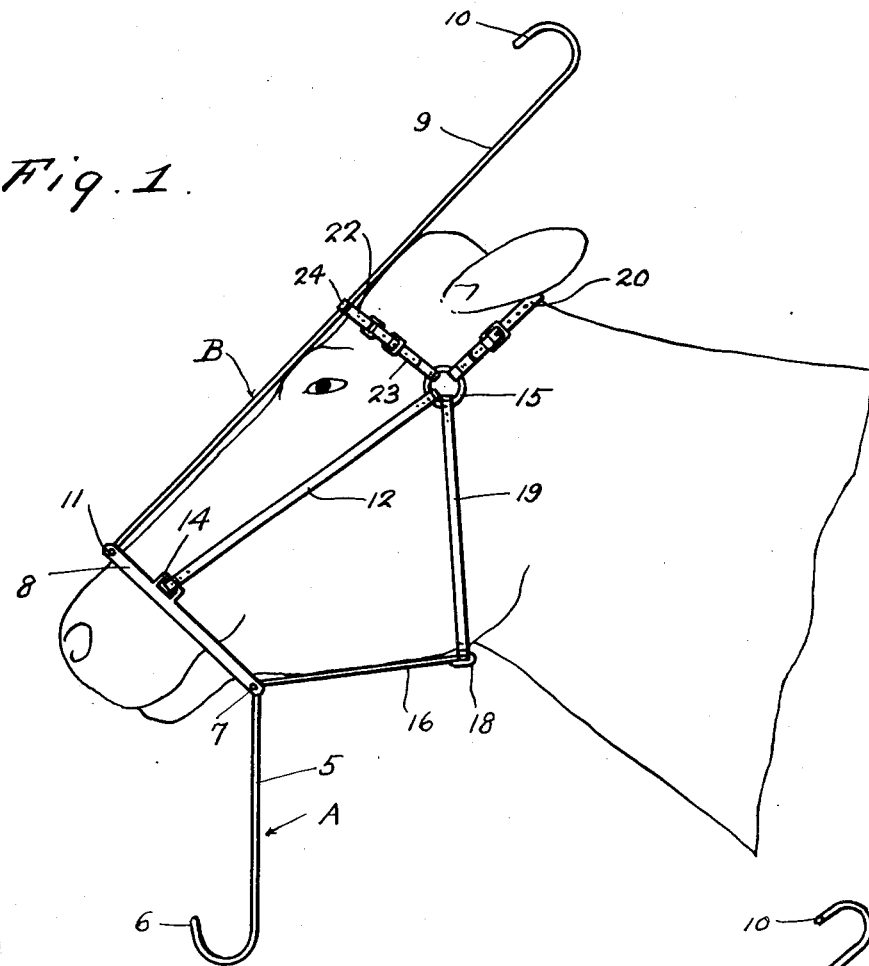
Figure 1 is a side elevation of the poke on an animal's head.
Figure 2:
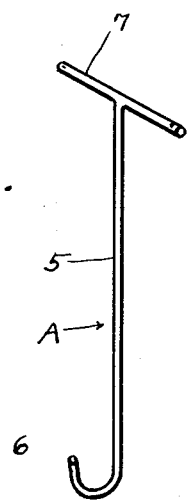
Figure 2 is a perspective view of the bottom hook.
Figure 3:
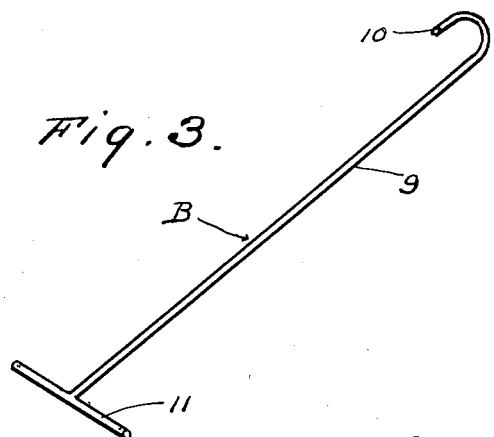
Figure 3 is a perspective view of the upper hook.

Referring to the drawings in detail it will be seen that the letter A denotes generally a bottom hook including a straight shank 5 with a curved end 6 which curves upwardly and forwardly. On the other end of the shank 5 is formed a cross rod 7. The ends of the cross rod 7 are journalled in side members 8 which project across the sides of the mouth of the animal. Letter B denotes generally the upper hook which comprises an elongated straight shank 9 terminating at one end in a forwardly and downwardly curved hook 10. At the other end there is formed a cross rod 11 the ends of which are journalled in the side bars 8. Straps 12 are engaged with eyes 14 on intermediate portions of the side bars 8 and also engage with rings 15. A strap bar 16 has one end bifurcated and curved to form sleeves 17 rockable about the rod 7 one to each side of the shank 5. The other end is curved to form an elongated boot 18 through which extends the strap 19 the ends of which are secured to the rings 15. An adjustable strap 20 extends over the head of the animal, back of the ears thereof, and is engaged with the rings 15. A top bar 22 has straps 23 engaged with the ends thereof and also engaged with the rings 15 and the center of this bar 22 is provided with a bracket 24 through which the shank 9 extends.

As will be seen from Figures 1 and 4, the frame, composed of the side bars 8 and the rods 7 and 11, is placed over the lower part of the animal's head, with the parts 22 and 23 extending over the upper part of the head above the eyes and a strap 20 passing over the top part of the head and back of the ears, with the strap 19 extending under the rear part of the head and alongside the side parts thereof. Thus the device is held in the position shown in Figures 1 and 4 on the animal's head, with the member A depending from the lower part of the head and the member B extending upwardly along the front of the head with its hook part 10 located an appreciable distance above the head. Thus these hook parts A and B will prevent the animal from poking its head between or over or under the wires of a fence.

It is thought that the construction, utility and advantages of this invention will now be quite apparent without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A poke structure of the class described including, in combination, a lower hook member formed with a straight shank having its lower end curved to provide a hook, a cross rod formed on the upper end of the shank, a pair of side bars in adjacent ends of which the ends of the rod are journalled, an upper hook member comprising a straight shank having a cross rod at one end with its ends journalled in the other ends of the side bars, said shank of the upper member terminating in a hook, and means for mounting the side bars on the head of an animal.

2. A poke structure of the class described including, in combination, a lower hook member formed with a straight shank having its lower end curved to provide a hook, a cross rod formed on the upper end of the shank, a pair of side bars in adjacent ends of which the ends of the rod are journalled, an upper hook member comprising a straight shank having a cross rod at one end with its ends journalled in the other end of the side bars, said shank of the upper member terminating in a hook, a chin bar rockably engaged with the rod of the lower member, a strap engaged with the chin bar, a pair of rings, the ends of the strap being engaged in the rings, side straps extending from intermediate portions of the side bars to the rings, a top bar with a bracket for receiving the shank of the upper member and having straps connecting it with the rings, and a head strap engaged with the rings.

JENS JENSEN.